C. E. LANE.
ADJUSTABLE DOUGH CUTTER.
APPLICATION FILED OCT. 9, 1908.
915,611.
Patented Mar. 16, 1909.
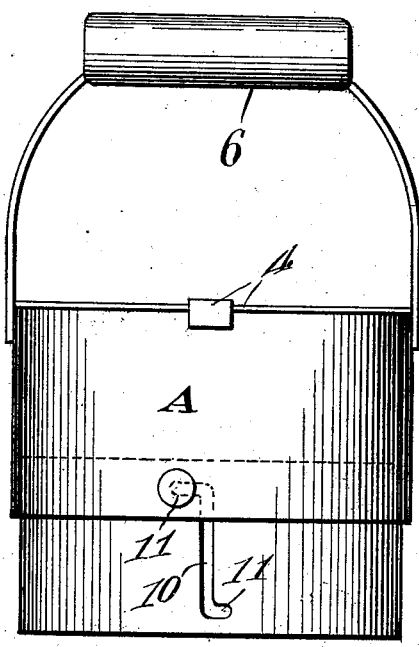
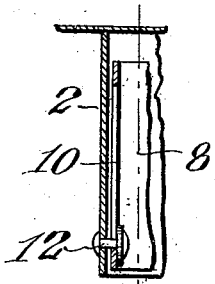
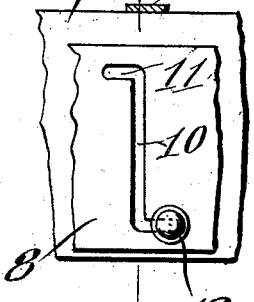
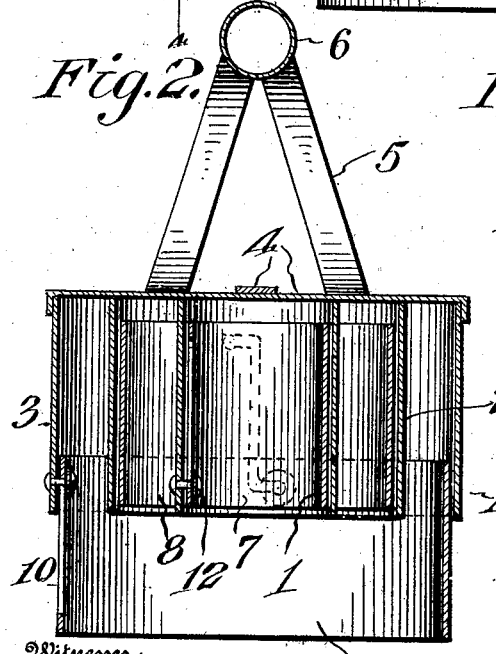
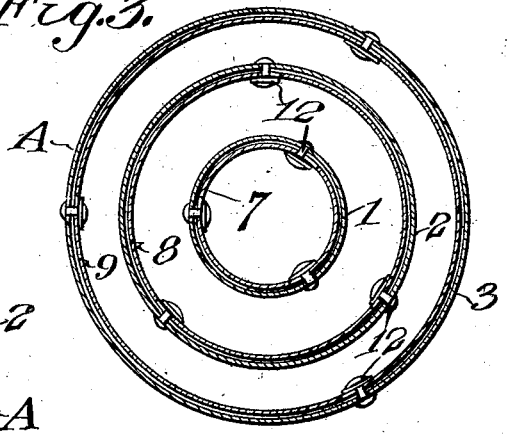
Inventor,
Clara E. Lane,
Witnesses:
Joe. P. Wahler,
C. Bradway
By Victor J. Evans,
Attorney

UNITED STATES PATENT OFFICE.

CLARA E. LANE, OF EUREKA SPRINGS, ARKANSAS.

ADJUSTABLE DOUGH-CUTTER.

No. 915,611.  Specification of Letters Patent.  Patented March 16, 1909.

Application filed October 9, 1908. Serial No. 456,941

*To all whom it may concern:*

Be it known that I, CLARA E. LANE, a citizen of the United States, residing at Eureka Springs, in the county of Carroll and State of Arkansas, have invented new and useful Improvements in Adjustable Dough-Cutters, of which the following is a specification.

This invention relates to a dough cutter designed especially for cutting doughnuts, cookies, biscuit and the like, and has for its object to provide a device of this character which is comparatively simple and inexpensive to manufacture, reliable and convenient in use, and readily adjusted for cutting pieces of different sizes.

Another object of the invention is the provision of a cutter consisting of a body having a plurality of independently-adjustable cutters in the form of bands which can be in either operative or inoperative position by simple relative rotary movement of the body and cutters.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a side view of the utensil. Fig. 2 is a central vertical section thereof. Fig. 3 is a horizontal section. Fig. 4 is a section on line 4—4, Fig. 5. Fig. 5 is a section on line 5—5, Fig. 4.

Similar reference characters are employed to designate corresponding parts throughout the views.

Referring to the drawing, A designates the body of the device which consists of a plurality of concentrically-arranged cylinders 1, 2 and 3, disposed one within the other and rigidly connected together by right-angularly disposed cross bars 4 to which the upper edges of the cylinders are soldered or otherwise suitably secured. This body is equipped with a bail 5 that has a handle or grip 6 whereby the utensil is used. Arranged within the cylinders are rings or bands 7, 8 and 9, which are independently adjustable or projectable out of its cylinder, the said bands serving as cutters whereby the pieces of dough are severed. The cutters are slidably mounted on their cylinders and connected therewith by bayonet slots 10 having their upper and lower edges recessed laterally at 11, as shown in Figs. 1 and 2, and on the cylinders are fixed rivets or headed fastenings 12 that pass through the slots 10. When the cutters are retracted or arranged within the body of the device, the stops or rivets 12 are disposed in the lower recesses 11 of the slots 10, and when any cutter is projected, the stops 12 of the companion cylinder are disposed in the upper offsets 11 of the slots 10. Any two of the cutters may be used at the same time in order to cut the dough for doughnuts or ring cakes, or if solid cookies are desired, simply one cutter will be employed. In order to set any cutter to operative position, the same is given a partial turn to remove the stops from the recesses 11 and then a longitudinal movement is imparted to the cutter until the stops reach the upper ends of the slots 10, when another partial turn is given to the cutter so as to lock the same in set position, as shown in Figs. 1 and 2.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that changes may be made when desired as are within the scope of the claim appended hereto.

Having thus described the invention, what I claim is:—

In a device of the class described, the combination of a body composed of concentrically arranged cylinders having their upper ends in the same plane, cross bars disposed over all the cylinders and rigidly secured to the upper edges thereof, said bars serving to hold the cylinders permanently in fixed relation, and a handle connected with the body, with a plurality of band-like cutters one arranged concentrically with respect to each cylinder and slidable up and down with relation thereto, said cutters having vertically-disposed slots provided with laterally-extending recesses at their ends, and fastenings on the cylinders extending through the slots of the cutters to permanently attach the latter to the cylinders and for locking the cutters in operative or inoperative position.

In testimony whereof I affix my signature in presence of two witnesses.

CLARA E. LANE.

Witnesses:
ZELLA M. LANE,
J. W. HOGG.